US008653823B2

(12) United States Patent
Gokhale et al.

(10) Patent No.: US 8,653,823 B2
(45) Date of Patent: Feb. 18, 2014

(54) DETECTION OF WELDED SWITCH CONTACTS IN A LINE CONVERTER SYSTEM

(75) Inventors: Kalyan P. Gokhale, New Berlin, WI (US); Douglas W. Karraker, Muskego, WI (US); Ilkka T. Pajari, Milwaukee, WI (US); Matti T. Jussila, Vantaa (FI)

(73) Assignees: ABB Inc., Cary, NC (US); ABB Oy, Helsinki (FI)

( * ) Notice: Subject to any disclaimer, the term of this patent is extended or adjusted under 35 U.S.C. 154(b) by 356 days.

(21) Appl. No.: 13/152,360

(22) Filed: Jun. 3, 2011

(65) Prior Publication Data

US 2011/0298470 A1 Dec. 8, 2011

Related U.S. Application Data

(60) Provisional application No. 61/351,667, filed on Jun. 4, 2010.

(51) Int. Cl.
*G01R 31/08* (2006.01)

(52) U.S. Cl.
USPC .......................................... 324/512; 324/522

(58) Field of Classification Search
None
See application file for complete search history.

(56) References Cited

U.S. PATENT DOCUMENTS

| | | | | |
|---|---|---|---|---|
| 4,367,510 A | * | 1/1983 | Watanabe | 361/160 |
| 4,620,272 A | * | 10/1986 | Fulton et al. | 363/53 |
| 5,095,223 A | * | 3/1992 | Thomas | 307/110 |
| 5,581,454 A | * | 12/1996 | Collins | 363/59 |

(Continued)

FOREIGN PATENT DOCUMENTS

| | | |
|---|---|---|
| DE | 102006030751 A1 | 12/2007 |
| EP | 2228895 A1 | 9/2010 |
| JP | 10144194 A | 5/1998 |

OTHER PUBLICATIONS

Authorized Officer Alexandra Kellner, European Patent Office International Search Report with a mailing date of Sep. 23, 2011 for International Patent Application No. PCT/US2011/039053 with an International filed of Jun. 3, 2011.

*Primary Examiner* — Vinh Nguyen
(74) *Attorney, Agent, or Firm* — Michael C. Prewitt; Paul R. Katterle; Melissa J. Szczepanik

(57) ABSTRACT

A system for the detection of welded contacts in a circuit of a line converter system has a plurality of inverter switches, a plurality of utility switches in which a pair of utility switches is connected in series through a line to a utility, a voltage detector, an electronic controller, and a DC input source. The line converter system converts incoming DC power into AC output power that is delivered to the utility grid. The voltage detector measures the voltage across a first node and a second node of the circuit and provides an output that is interpreted by an electronic controller for each step performed during a method of detection of welded contacts. The detection method has a sequence of test steps in which at least one switch is opened and/or closed, a DC bus of the inverter or the utility grid is used as a stimulus voltage, and the voltage is measured. If a voltage is not detected across the first and second nodes, the test sequence is continued until a welded contact is detected or the electronic controller determines that none of the contacts are welded. If the controller determines that none of the contacts are welded, the line converter system is permitted to connect and supply AC power to the utility.

21 Claims, 5 Drawing Sheets

(56) References Cited

U.S. PATENT DOCUMENTS

| | | | |
|---|---|---|---|
| 6,239,997 B1 * | 5/2001 | Deng | 363/95 |
| 6,914,440 B2 * | 7/2005 | Matuschek et al. | 324/691 |
| 7,459,910 B2 | 12/2008 | Kawamura et al. | |
| 2011/0115460 A1 * | 5/2011 | Elliott et al. | 323/285 |

* cited by examiner

DETECTION OF WELDED SWITCH CONTACTS IN A LINE CONVERTER SYSTEM

CROSS-REFERENCE TO RELATED APPLICATION

This application claims the benefit of U.S. provisional patent application No. 61/351,667 filed on Jun. 4, 2010, which is hereby incorporated by reference in its entirety.

BACKGROUND

Alternative power sources are increasingly being tapped to play a larger role in the overall power production scheme. This is being driven largely by environmental concerns related to traditional carbon intensive power sources such as coal. One such alternative power source is photovoltaic panels, which convert solar energy to a direct current. For most consumer use, and in order to be connected to an electricity grid, the DC power must be converted to an alternating current. With reference to FIG. 1, a prior art line converter system is shown which feeds the solar generated power to an electrical utility grid. As can be seen, the inverter generally includes a DC to AC inverter, filters, and electromechanical switches, which interface with the utility. Exemplary electromechanical switches include relays or contactors. Safety standards require two separate switches in series with the output phases to disconnect the line converter system from the utility. Safety standards also require that the system be capable of performing a self test to ensure that these switches are properly operating before connecting the line converter system to the utility.

There is therefore a need in the art for a system that tests the switches in a line converter system.

SUMMARY

A line converter system for connecting a power source to a utility grid comprises an inverter having a DC bus and a plurality of inverter switches, a plurality of lines for connecting the inverter to the utility grid, a plurality of line switches wherein a pair of the line switches is connected in series into each of the lines, a voltage detector, and a controller connected to the inverter switches and the line switches. Each line of the plurality of lines has a first end connected to the inverter and a second end for connection to the utility grid. The voltage detector is connected to the lines, respectively, at a point between the line switches. The controller is comprised of a processor and computer readable medium having program instructions stored thereon, which when executed by the processor are operable to perform a method of detecting stuck contacts in the line switches when the line converter system is connected to the utility grid.

A method of detecting stuck contacts in the line switches is comprised of: opening the inverter switches so that no voltage from the DC bus is applied to the line switches located toward the first ends of the lines, transmitting open commands to the line switches, after transmitting the open commands, determining whether the voltage detector has detected a voltage, and if the voltage detector is determined to have detected a voltage, determining that the line switches located toward the second ends of the lines have contacts that are stuck together.

A line converter system connected to a utility grid has an inverter system that is comprised of an inverter having a DC bus and a plurality of inverter switches. A plurality of lines connects the inverter to the utility grid wherein each line has a first end connected to the inverter and a second end connected to the utility grid. Line switches are connected into each of the lines wherein a pair of line switches are connected in each line in series to the utility. The method of detecting stuck contacts in a line converter system comprises: (a.) opening the inverter switches so that no voltage from the DC bus is applied to the line switches located toward the first ends of the lines; (b.) transmitting open commands to the line switches; (c.) after transmitting the open commands, determining whether there is a voltage between a first point located between the line switches in a first one of the lines and a second point located between the line switches in a second one of the lines; and (d.) if a voltage is detected in step (c.), determining that the line switches located toward the second ends of the lines have contacts that are stuck together.

BRIEF DESCRIPTION OF THE DRAWINGS

In the accompanying drawings, structural embodiments are illustrated that, together with the detailed description provided below, describe exemplary embodiments of a system and method for detection of welded contacts in a line converter system. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

The present invention provides a system and method of testing the proper operation of all switches in a power line converter system. Accordingly, the system verifies that each switch, when commanded to open, in fact completes the commanded operation. The most common reason for the switch failure (typically manifested by a switch failing to open) is welded contacts. A welded contact condition occurs when excessive current flows through the contacts for a short time. It should be appreciated, however, that though welded contacts are the most common type of failure, other failure modes may prevent opening of the contacts.

Figure 1:
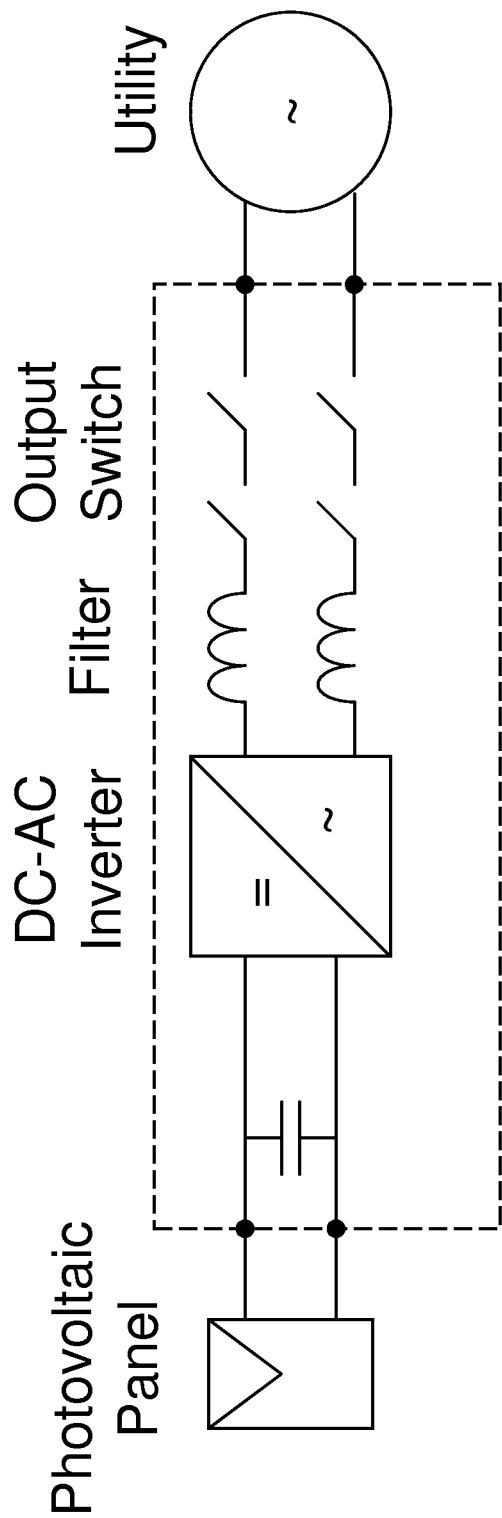
FIG. 1 is a schematic view of a prior art line converter.
Figure 2:
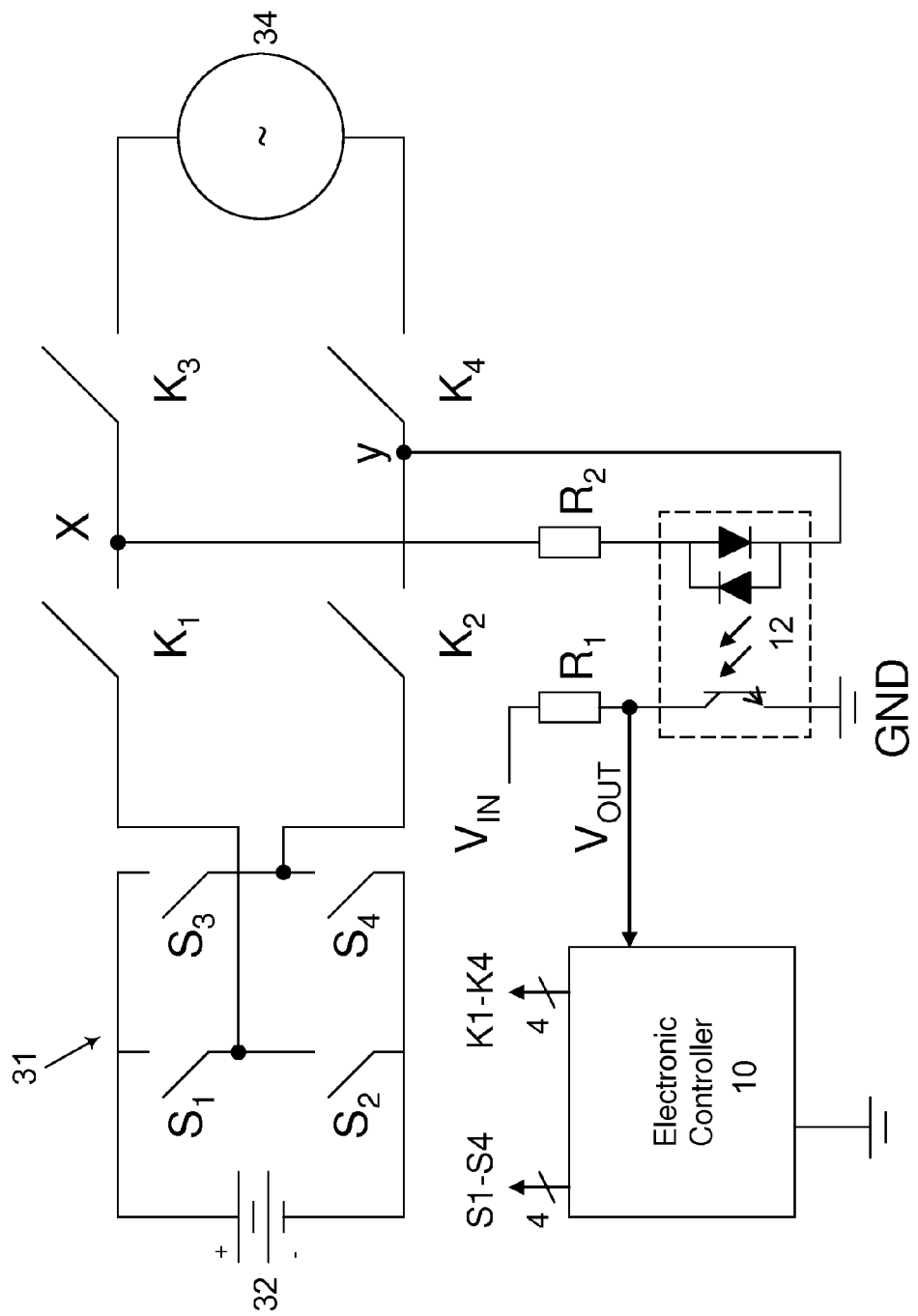
FIG. 2 is a schematic view of an electrical circuit embodied in accordance with the present invention to detect welded switch contacts by detecting voltage across a node X and a node Y.

With reference now to FIG. 2, a circuit for detecting welded switch contacts is shown. The circuit has an inverter 31 which comprises a DC bus 32 and inverter switches $S_1$-$S_4$, a plurality of lines for connecting the inverter 31 to a utility grid 34 wherein each line has a first end and a second end, line switches $K_1$-$K_4$ of which a pair of line switches connect in each line of the plurality of lines to the utility grid 34, an opto-coupler 12, and a controller 10 connected to the inverter switches $S_1$-$S_4$ and the line switches $K_1$-$K_4$. Each line of the plurality of lines has a first end connected to the inverter 31 and a second end for connection to the utility grid 34.

As can be seen, line switches $K_1$-$K_4$ are independently controlled by the electronic controller 10 which may send a signal 4 or command line switches $K_1$-$K_4$ in another manner. According to one embodiment, the electronic controller 10 may include a microcontroller. The controller 10 includes a processor for executing one or more programs stored in associated memory. During normal operation of the inverter 31, the controller 10 may control the inverter 31 using pulse width modulation (PWM), wherein the inverter switches S1-S4 are opened and closed to create a series of voltage pulses, wherein the average voltage is the peak voltage times the duty cycle, i.e., the "on" and "off" times of pulses. In this manner, a sine wave can be approximated using a series of variable-width positive and negative voltage pulses. The phase and the amplitude of the sine wave can be changed by changing the PWM pattern.

The bipolar opto-coupler 12 with dual-LEDs (light emitting diode) is connected between nodes X and Y of the circuit. The electronic controller 10 also independently controls semiconductor switches $S_1$-$S_4$ of the inverter 31. Any voltage appearing across nodes X and Y turns on one of the two LEDs of the opto-coupler 12 and produces a change of logic state from "1" to "0" at the output of the opto-coupler 12. The digital output of the opto-coupler 12 is fed to the electronic controller 10. As will be appreciated by one having ordinary skill in the art, the opto-coupler 12 and associated resistors $R_1$ and $R_2$ function as a voltage detector and the logic state at the output of the voltage detector is not limited to the aforementioned values. Therefore, any other arrangement may be used to indicate the presence or absence of a measured value or range of values.

Figure 3:
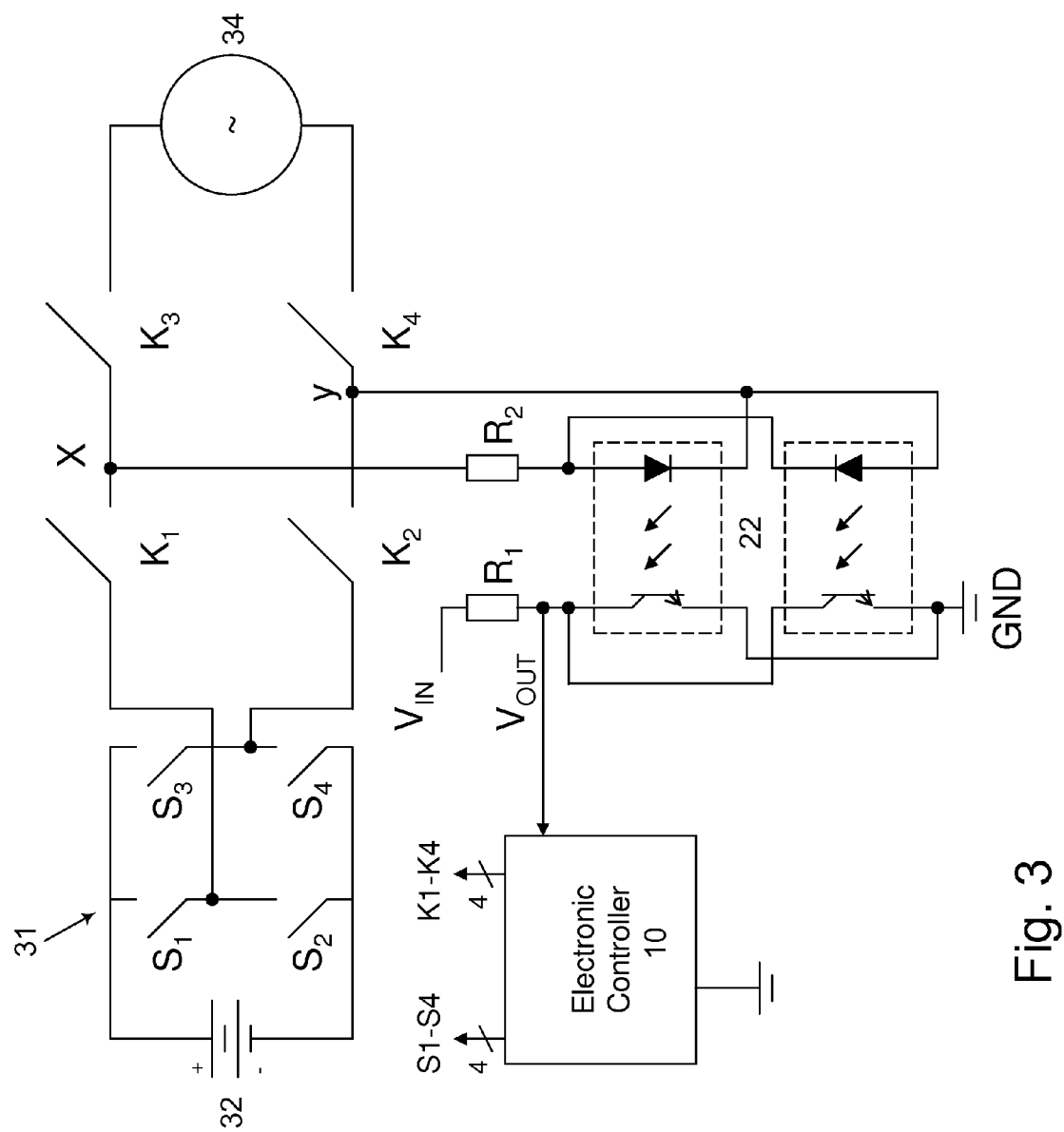
FIG. 3 is a schematic view of a second embodiment of an electrical circuit to detect welded switch contacts.

With reference now to FIG. 3, a second detection circuit embodiment is shown, which is substantially similar to the circuit of FIG. 2, except that one bipolar opto-coupler 12 may be replaced by two unipolar opto-couplers 22.

Figure 4:
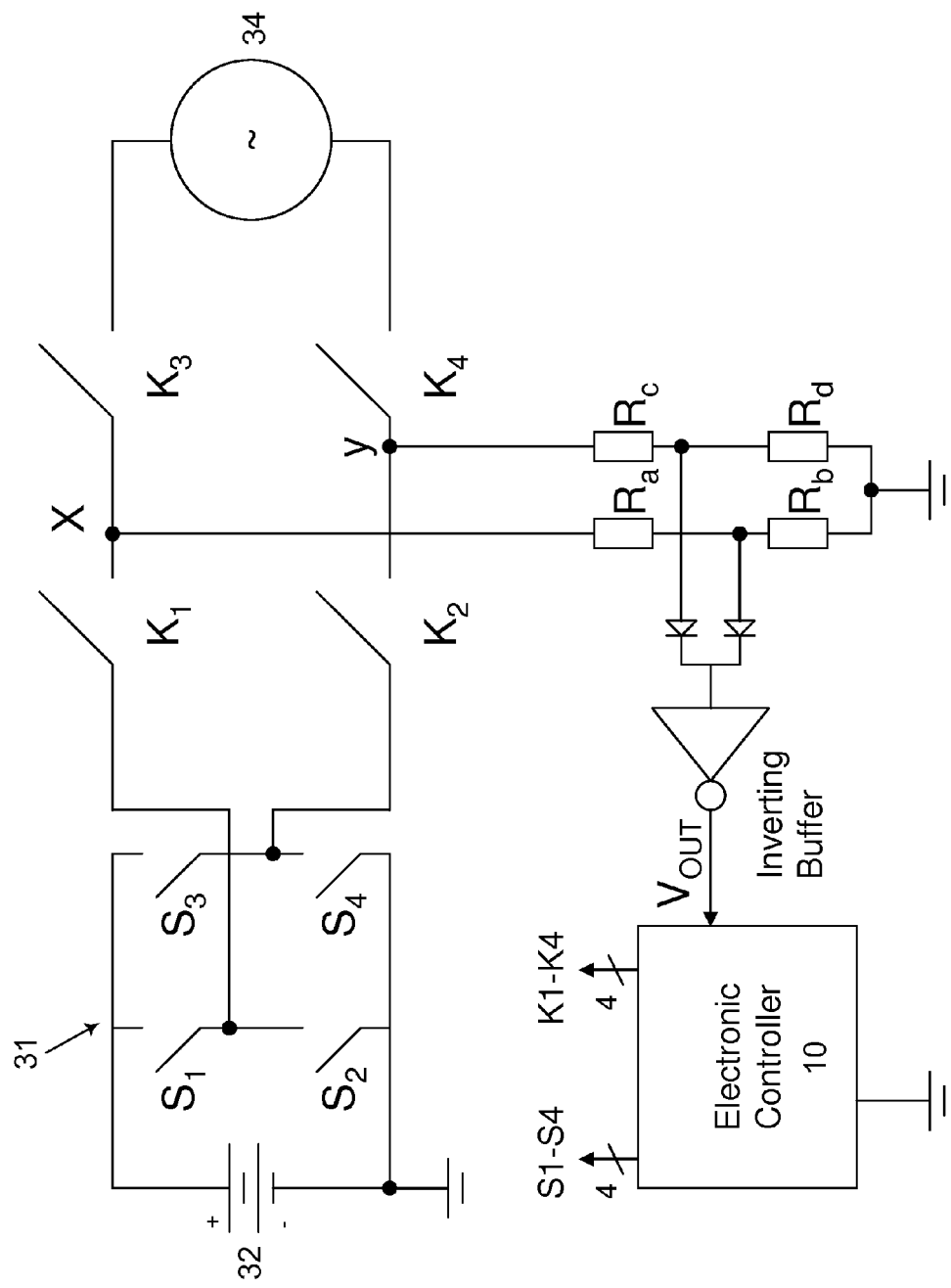
FIG. 4 is a schematic view of a third embodiment of an electrical circuit to detect voltages across nodes X and Y when an electronic controller is at the same potential as an inverter.

If the electronic controller 10 is at the same potential as the negative terminal of the DC bus 32 of the inverter 31, a third detection circuit embodiment may be used, as shown in FIG. 4. As can be seen, instead of an opto-coupler 12, two simple resistor dividers measure voltages at nodes X and Y, respectively. The two diodes, diode one and diode two, or the signals from the two voltage dividers and the inverting buffer, produce a logic level signal to be fed to the electronic controller 10.

Thus, using the circuit shown in FIGS. 2-4, a logic level signal 0 is output to the electronic controller 10 if a voltage is present between nodes X and Y and a logic level signal 1 is output if no voltage is present between nodes X and Y. The controller 10 executes a test sequence which controls the closing and opening of the line switches $K_1$-$K_4$ in conjunction with the semiconductor switches $S_1$-$S_4$. During the test sequence, the digital output state of the opto-coupler 12 (or resistor dividers) is monitored by the electronic controller 10. The electronic controller 10 may then make a diagnostic decision about which (if any) of the four switches $K_1$-$K_4$ is stuck closed. The principle of the operation is that the voltage appearing across nodes X and Y is only non-zero if two or more of the four switches $K_1$-$K_4$ are closed. The DC bus 32 voltage of the inverter 31 and the utility 34 voltage are both used as stimulus voltage sources for this purpose.

Figure 5:
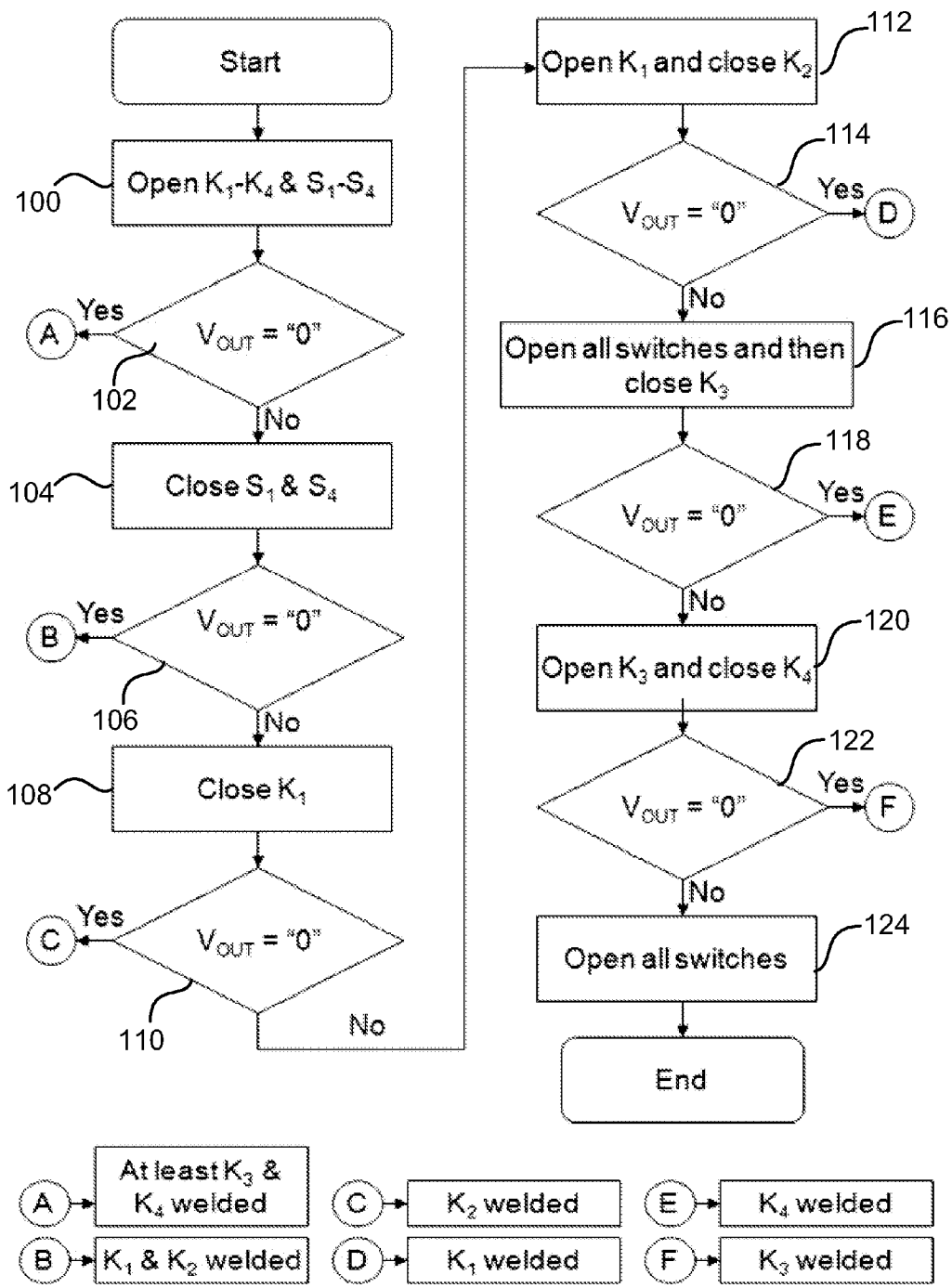
FIG. 5 is a flow chart of a process for detecting welded switches.

With reference now to FIG. 5, a flow chart is shown which illustrates the operation of the electronic controller 10 as it proceeds through the test sequence. In a first step 100, the electronic controller 10 commands switches $S_1$-$S_4$ and $K_1$-$K_4$ to open. At step 102, if switches $K_1$-$K_4$ are functioning properly (i.e. all are open), the voltage between nodes X and Y is zero and the opto-coupler 12 output is in the "1" state. However, if at step 102, the opto-coupler 12 output is in the "0" state, the controller 10 determines that at least the contacts of switches $K_3$ and $K_4$ are stuck closed or welded and the test sequence terminates.

If the opto-coupler 12 does not detect a voltage, then at step 104 the controller continues the test sequence by commanding the inverter switches $S_1$ and $S_4$ to close for a short time to produce a positive voltage pulse while the line switches $K_1$-$K_4$ remain opened. At step 106, if the output of the opto-coupler 12 registers "0", the controller determines that both $K_1$ and $K_2$ are stuck closed or welded and the test sequence terminates.

If the opto-coupler 12 does not detect a voltage, then at step 108 the controller 10 continues the test sequence by allowing $S_1$ and $S_4$ to remain closed and commanding only $K_1$ to close ($K_2$, $K_3$ and $K_4$ are allowed to remain open). At step 110, if the output of the opto-coupler 12 registers "0" then the controller 10 determines that $K_2$ is stuck closed or welded and the test sequence terminates.

If the opto-coupler 12 does not detect a voltage, then at step 112 the controller 10 continues the test sequence by allowing switches $S_1$ and $S_4$ to remain closed, and commanding only $K_2$ to close and $K_1$ to open ($K_3$ and $K_4$ are allowed to remain open). At step 114, if the output of the opto-coupler 12 registers "0" then the controller 10 determines that $K_1$ is stuck closed or welded and the test sequence terminates.

If the opto-coupler 12 does not detect a voltage, then at step 116 the controller 10 continues the test sequence by commanding switches $S_1$-$S_4$ to open, and closes only $K_3$ ($K_1$, $K_2$ and $K_4$ are allowed to remain open). At step 118, if the output of the opto-coupler 12 registers "0" then the controller 10 determines that $K_4$ is stuck closed or welded and the test sequence terminates.

If the opto-coupler 12 does not detect a voltage, then at step 120 the controller 10 continues the test sequence by allowing all inverter switches $S_1$-$S_4$ to remain open, and commanding $K_4$ to be closed and $K_3$ to be opened ($K_1$ and $K_2$ are allowed to remain open). If, at step 122, the output of the opto-coupler 12 registers "0" the controller 10 determines that $K_3$ is stuck closed or welded and the test sequence terminates. Finally, at step 124 all switches are opened in preparation for commencement of normal operations.

It should be appreciated that steps 100 through 106 are preferably performed in the order disclosed above and that another voltage detector may be used in place of the opto-coupler 12 and with other components including but not limited to resistors, diodes, an inverting buffer or another component. By first testing if $K_3$ and $K_4$ are both welded, then testing if $K_1$ and $K_2$ are both welded, the system can prevent direct connection to the electrical network. Once it is determined that $K_3$ and $K_4$ or $K_1$ and $K_2$ are not welded, then the testing of individual switches may be accomplished. For this reason, though it is preferred that steps 100 through 106 proceed in the order described above, the individual testing of each switch (steps 108/110, 112/114, 116/118 and 120/122) may be performed in any order.

The above described test sequence may be performed, for example, each morning prior to initialization of the line converter. As described above, should the controller 10 determine that one or more of line switches $K_1$-$K_4$ is welded at any point during the test sequence, an error message is created, the test sequence is terminated, and operation of the line converter is prevented. Should the test sequence complete successfully (i.e. no switches welded) the system is allowed to initialize and connect to the electrical utility network by closing line switches $K_1$-$K_4$.

As will be appreciated by one of ordinary skill in the art, various functions performed by the controller 10 may be embodied as or take the form of a computer readable medium having computer-readable instructions stored thereon which, when executed by a processor, carry out the operations of the present inventions as previously described. The computer-readable medium may be any medium that can contain, store, communicate, propagate, or transport the user-interface program instruction for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the previously described technical results.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A line converter system for connecting a power source to a utility grid, comprising:
    an inverter having a DC bus and a plurality of inverter switches;
    a plurality of lines for connecting the inverter to the utility grid, each line having a first end connected to the inverter and a second end for connection to the utility grid;
    a plurality of line switches, a pair of the line switches being connected in series into each of the lines;
    a voltage detector connected to the lines, respectively, the voltage detector being connected to each of the lines at a point between the line switches; and
    a controller connected to the inverter switches and the line switches, the controller comprising a processor and computer readable medium having program instructions stored thereon, which when executed by the processor are operable to perform a method of detecting stuck contacts in the line switches when the line converter system is connected to the utility grid, the method comprising:
    (a.) opening the inverter switches so that no voltage from the DC bus is applied to the line switches located toward the first ends of the lines;
    (b.) transmitting open commands to the line switches;
    (c.) after transmitting the open commands, determining whether the voltage detector has detected a voltage; and
    (d.) if the voltage detector is determined to have detected a voltage in step (c.), determining that the line switches located toward the second ends of the lines have contacts that are stuck together.

2. The line converter system of claim 1, wherein the method further comprises:
    (e.) if the voltage detector is determined not to have detected a voltage in step (c.), closing a pair of the inverter switches so that a voltage from the DC bus is applied to the line switches located toward the first ends of the lines;
    (f.) after step (e.) and with the line switches commanded to be open, determining whether the voltage detector has detected a voltage;
    (g.) if the voltage detector is determined to have detected a voltage in step (f.), determining that the line switches located toward the first ends of the lines have contacts that are stuck together.

3. The line converter system of claim 2, wherein the method further comprises:
    (h.) if the voltage detector is determined not to have detected a voltage in step (f.), transmitting a close command to a first one of the line switches, which is connected into a first one of the lines, toward the first end;
    (i.) after step (h.), with the pair of the inverter switches closed and with the first one of the line switches commanded to be closed and the other line switches commanded to be open, determining whether the voltage detector has detected a voltage;
    (j.) if the voltage detector is determined to have detected a voltage in step (i.), determining that a second one of the line switches, which is connected into a second one of the lines, toward the first end, has contacts that are stuck together.

4. The line converter system of claim 3, wherein the method further comprises:
    (k.) if the voltage detector is determined not to have detected a voltage in step (i.), transmitting an open command to the first one of the line switches and a close command to the second one of the line switches;
    (l.) after step (k.), with the pair of the inverter switches closed and with the second one of the line switches commanded to be closed and the other line switches commanded to be open, determining whether the voltage detector has detected a voltage;
    (m.) if the voltage detector is determined to have detected a voltage in step (l.), determining that the first one of the line switches has contacts that are stuck together.

5. The line converter system of claim 4, wherein the method further comprises:
    (n.) if the voltage detector is determined not to have detected a voltage in step (l.), opening the pair of the inverter switches and transmitting a close command to a third one of the line switches, which is connected into the first one of the lines, toward the second end;
    (o.) after step (n.) and with the inverter switches open and with the third one of the line switches commanded to be closed and the other line switches commanded to be open, determining whether the voltage detector has detected a voltage;
    (p.) if the voltage detector is determined to have detected a voltage in step (o.), determining that a fourth one of the line switches, which is connected into the second one of the lines, toward the second end, has contacts that are stuck together.

6. The line converter system of claim 5, wherein the method further comprises:
(q.) if the voltage detector is determined not to have detected a voltage in step (o.), transmitting an open command to the third one of the line switches and transmitting a close command to the fourth one of the line switches;
(r.) after step (q.) and with the inverter switches open and with the fourth one of the line switches commanded to be closed and the other line switches commanded to be open, determining whether the voltage detector has detected a voltage;
(s.) if the voltage detector is determined to have detected a voltage in step (r.), determining that the third one of the line switches has contacts that are stuck together.

7. The line converter system of claim 1, wherein the method further comprises:
(e.) if the voltage detector is determined not to have detected a voltage in step (c.), transmitting a close command to a first one of the line switches, which is connected into a first one of the lines, toward the second end;
(f.) after step (e.) and with the inverter switches open and with the first one of the line switches commanded to be closed and the other line switches commanded to be open, determining whether the voltage detector has detected a voltage;
(g.) if the voltage detector is determined to have detected a voltage in step (f.), determining that a second one of the line switches, which is connected into a second one of the lines, toward the second end, has contacts that are stuck together.

8. The line converter system of claim 7, wherein the method further comprises:
(h.) if the voltage detector is determined not to have detected a voltage in step (f.), transmitting an open command to the first one of the line switches and transmitting a close command to the second one of the line switches;
(i.) after step (h.) and with the inverter switches open and with the second one of the line switches commanded to be closed and the other line switches commanded to be open, determining whether the voltage detector has detected a voltage;
(j.) if the voltage detector is determined to have detected a voltage in step (i.), determining that the first one of the line switches has contacts that are stuck together.

9. The line converter system of claim 1, wherein the voltage detector comprises an opto-coupler.

10. The line converter system of claim 9, wherein the opto-coupler is a bipolar opto-coupler.

11. The line converter system of claim 9, wherein the opto-coupler is a first unipolar opto-coupler and wherein the voltage detector further comprises a second unipolar opto-coupler.

12. The line converter system of claim 1, wherein the voltage detector comprises a voltage divider.

13. The line converter system of claim 1, wherein the power source comprises photovoltaic panels.

14. A method of detecting stuck contacts in a line converter system connected to a utility grid, wherein the inverter system comprises an inverter having a DC bus and a plurality of inverter switches, wherein a plurality of lines connect the inverter to the utility grid, each line having a first end connected to the inverter and a second end connected to the utility grid, and wherein a pair of line switches are connected in series into each of the lines, the method comprising:
(a.) opening the inverter switches so that no voltage from the DC bus is applied to the line switches located toward the first ends of the lines;
(b.) transmitting open commands to the line switches;
(c.) after transmitting the open commands, determining whether there is a voltage between a first point located between the line switches in a first one of the lines and a second point located between the line switches in a second one of the lines; and
(d.) if a voltage is detected in step (c.), determining that the line switches located toward the second ends of the lines have contacts that are stuck together.

15. The method of claim 14, further comprising:
(e.) if a voltage is not detected in step (c.), closing a pair of the inverter switches so that a voltage from the DC bus is applied to the line switches located toward the first ends of the lines;
(f.) after step (e.) and with the line switches commanded to be open, determining whether there is a voltage between the first and second points;
(g.) if a voltage is detected in step (f.), determining that the line switches located toward the first ends of the lines have contacts that are stuck together.

16. The method of claim 15, further comprising:
(h.) if a voltage is not detected in step (f.), transmitting a close command to a first one of the line switches, which is connected into the first one of the lines, toward the first end;
(i.) after step (h.), with the pair of the inverter switches closed and with the first one of the line switches commanded to be closed and the other line switches commanded to be open, determining whether there is a voltage between the first and second points;
(j.) if a voltage is detected in step (i.), determining that a second one of the line switches, which is connected into the second one of the lines, toward the first end, has contacts that are stuck together.

17. The method of claim 16, further comprising:
(k.) if a voltage is not detected in step (i.), transmitting an open command to the first one of the line switches and a close command to the second one of the line switches;
(l.) after step (k.), with the pair of the inverter switches closed and with the second one of the line switches commanded to be closed and the other line switches commanded to be open, determining whether there is a voltage between the first and second points;
(m.) if a voltage is detected in step (l.), determining that the first one of the line switches has contacts that are stuck together.

18. The method of claim 17, further comprising:
(n.) if a voltage is not detected in step (l.), opening the pair of the inverter switches and transmitting a close command to a third one of the line switches, which is connected into the first one of the lines, toward the second end;
(o.) after step (n.) and with the inverter switches open and with the third one of the line switches commanded to be closed and the other line switches commanded to be open, determining whether there is a voltage between the first and second points;
(p.) if a voltage is detected in step (o.), determining that a fourth one of the line switches, which is connected into the second one of the lines, toward the second end, has contacts that are stuck together.

19. The method of claim 18, further comprising
(q.) if a voltage is not detected in step (o.), transmitting an open command to the third one of the line switches and transmitting a close command to the fourth one of the line switches;
(r.) after step (q.) and with the inverter switches open and with the fourth one of the line switches commanded to be closed and the other line switches commanded to be open, determining whether there is a voltage between the first and second points;
(s.) if a voltage is detected in step (r.), determining that the third one of the line switches has contacts that are stuck together.

20. The method of claim 14, further comprising:
(e.) if a voltage is not detected in step (c.), transmitting a close command to a first one of the line switches, which is connected into the first one of the lines, toward the second end;
(f.) after step (e.) and with the inverter switches open and with the first one of the line switches commanded to be closed and the other line switches commanded to be open, determining whether there is a voltage between the first and second points;
(g.) if a voltage is detected in step (f.), determining that a second one of the line switches, which is connected into a second one of the lines, toward the second end, has contacts that are stuck together.

21. The method of claim 20, further comprising:
(h.) if a voltage is not detected in step (f.), transmitting an open command to the first one of the line switches and transmitting a close command to the second one of the line switches;
(i.) after step (h.) and with the inverter switches open and with the second one of the line switches commanded to be closed and the other line switches commanded to be open, determining whether there is a voltage between the first and second points;
(j.) if a voltage is detected in step (i.), determining that the first one of the line switches has contacts that are stuck together.

* * * * *